(12) United States Patent
Bhageria et al.

(10) Patent No.: US 8,937,456 B2
(45) Date of Patent: Jan. 20, 2015

(54) REAL TIME SYSTEM AND METHOD FOR OPTIMIZING AND MANAGING A LOAD IN AN ELECTRICAL GRID

(75) Inventors: Gopal K. Bhageria, Overland Park, KS (US); Don T. Mak, Reston, VA (US); Kevin M. Monagle, Wellesley, MA (US); Sri Ramanathan, Lutz, FL (US); Jean-Gael F. Reboul, Kenmore, WA (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 13/091,496

(22) Filed: Apr. 21, 2011

(65) Prior Publication Data
US 2012/0268061 A1    Oct. 25, 2012

(51) Int. Cl.
*H02J 7/00* (2006.01)
*B60L 11/18* (2006.01)

(52) U.S. Cl.
CPC .......... *B60L 11/1816* (2013.01); *B60L 11/184* (2013.01); *B60L 11/1842* (2013.01); *B60L 11/1844* (2013.01); *B60L 11/1846* (2013.01); *B60L 11/1848* (2013.01); *B60L 2240/72* (2013.01); *Y02T 10/7088* (2013.01); *Y02T 10/7005* (2013.01); *Y02T 90/163* (2013.01); *Y02T 90/169* (2013.01); *Y02T 90/121* (2013.01); *Y02T 90/14* (2013.01); *Y02T 90/128* (2013.01); *Y04S 10/126* (2013.01); *Y04S 30/14* (2013.01); *Y02E 60/721* (2013.01)
USPC ............................ 320/109; 320/104; 320/107

(58) Field of Classification Search
CPC ............ B60L 11/1844; B60L 2240/72; Y02T 10/7005; Y02T 10/7088; Y02T 90/128; Y02T 90/163; Y02E 60/721
USPC .......................... 320/104, 107, 109, 115, 134
See application file for complete search history.

(56) References Cited

U.S. PATENT DOCUMENTS

| | | |
|---|---|---|
| 6,684,156 B2 | 1/2004 | Fujimoto et al. |
| 7,792,613 B2 | 9/2010 | Kressner et al. |
| 2009/0030712 A1 | 1/2009 | Bogolea et al. |
| 2009/0091291 A1 | 4/2009 | Woody et al. |
| 2009/0138100 A1 | 5/2009 | Khorramshahi |
| 2009/0174365 A1 | 7/2009 | Lowenthal et al. |
| 2009/0313098 A1 | 12/2009 | Hafner et al. |
| 2010/0013436 A1 | 1/2010 | Lowenthal et al. |
| 2010/0017249 A1 | 1/2010 | Fincham et al. |

(Continued)

OTHER PUBLICATIONS

IBM Corporation, "Method, system, and apparatus for reserving the use of a re-charging station for a Plug-in Hybrid Vehicle", IP.com PriorArt Database, Jun. 10, 2009, 3 pages.

*Primary Examiner* — Edward Tso
*Assistant Examiner* — Aaron Piggush
(74) *Attorney, Agent, or Firm* — Matthew Chung; Roberts Mlotkowski Safran & Cole, P.C.

(57) ABSTRACT

A system and a method are provided for optimizing and managing a load in an electrical grid. The method includes receiving an event notification associated with a mobile device requiring a charge and determining charging station information of at least one charging station in an electrical grid based on the event notification, the at least one charging station operable to charge the mobile device. The charging station information of the at least one charging station is sent to a user of the mobile device.

11 Claims, 5 Drawing Sheets

(56) References Cited

U.S. PATENT DOCUMENTS

| | | |
|---|---|---|
| 2010/0049737 A1 | 2/2010 | Ambrosio et al. |
| 2010/0106401 A1 | 4/2010 | Naito et al. |
| 2010/0211643 A1 | 8/2010 | Lowenthal et al. |
| 2011/0025556 A1* | 2/2011 | Bridges et al. ........... 342/357.25 |

* cited by examiner

REAL TIME SYSTEM AND METHOD FOR OPTIMIZING AND MANAGING A LOAD IN AN ELECTRICAL GRID

TECHNICAL FIELD

The present invention generally relates to an electrical grid, and more particularly, to a real time system and method for optimizing and managing a load in the electrical grid.

BACKGROUND

An electrical grid is an interconnected network for delivering electricity from suppliers to consumers. More specifically, the electrical grid is a vast, interconnected network, of transmission lines, starting from a supplier of electricity to a consumer of the electricity. The consumer may be, for example, a personal consumer or an industrial consumer. It has become increasingly important to manage the electrical grid, in order to more efficiently distribute electricity in an environmentally friendly manner. For example, the electrical grid has been connected to environmentally friendlier sources such as, for example, windmills, which provide less pollutants. Also, it has become more vital to manage the electrical grid to distribute electricity in a reliable manner, without overloading the electrical grid and/or providing a low quality power charge.

SUMMARY

In a first aspect of the invention, a method comprises receiving an event notification associated with a mobile device requiring a charge and determining charging station information of at least one charging station in an electrical grid based on the event notification, the at least one charging station operable to charge the mobile device. The charging station information of the at least one charging station is sent to a user of the mobile device.

In another aspect of the invention, a system is implemented in hardware which comprises a domain server operable to: receive an event notification from a subscriber device associated with a mobile device; determine grid information of an electrical grid including at least one charging station operable to charge the mobile device; determine charging station information of a preferred charging station in the electrical grid based on the event notification, the grid information, and grid configuration rules; and configure the electrical grid based on at least one of the event notification, the grid information, and the charging station information.

In an additional aspect of the invention, a computer program product includes a computer usable storage medium having readable program code embodied in the storage medium. The computer program product comprises at least one component operable to: detect an event at a mobile device; send a Session Initiation Protocol (SIP) message including an event notification to a presence server in an electrical grid; and receive charging station information of a preferred charging station in the electrical grid, which instructs a user of the mobile device to travel to the preferred charging station. The preferred charging station is operable to charge the mobile device.

In a further aspect of the invention, a method of optimizing and managing loads in an electrical grid, comprises providing a computer infrastructure, which is operable to: receive an event notification associated with a mobile device requiring a charge; determine charging station information of at least one charging station in an electrical grid based on the event notification, the at least one charging station operable to charge the mobile device; and send the charging station information of the at least one charging station to a user of the mobile device.

In another aspect of the invention, a computer system for optimizing and managing loads in an electrical grid is provided. The system comprises a CPU, a computer readable memory and a computer readable storage media. First program instructions receive an event notification of a subscriber device associated with a mobile device. Second program instructions determine grid information of the electrical grid including at least one charging station operable to charge the mobile device. Third program instructions receive grid configuration rules indicating how to configure the electrical grid in response to charging of mobile devices, from a rules database. Fourth program instructions determine charging station information of a preferred charging station in the electrical grid based on the event notification, the grid information, and the grid configuration rules. Fifth program instructions send the charging station information to the subscriber device. Sixth program instructions update the grid information based on the event notification, the grid information, and the charging station information. Seventh program instructions configure the electrical grid based on at least one of the event notification, the updated grid information, and the charging station information. The first, second, third, fourth, fifth, sixth, and seventh program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to an electrical grid, and more particularly, to a real time system and method for optimizing and managing a load in the electrical grid. In embodiments, the electrical grid can be a smart grid that delivers electricity from suppliers to consumers, and allows the suppliers and consumers to communicate with electrical components on the smart grid, to save energy, to reduce costs, as well as to be more environmentally-sound. The smart grid has many different dimensions, which are broad and structural in nature, in which the present invention provides several changes and improvements thereto, for example, the intersections between an Internet Protocol (IP) backplane and the traditional electrical grid.

In particular, the present invention provides a system and method to manage loads on a smart grid, and in particular, to manage charging of a plurality of plug-in electric vehicles (PEVs) or other mobile devices, either at home or at charging stations. In embodiments, the smart grid includes a grid control center that can optimize and manage these loads at the charging stations, to avoid overloading a particular charging station or a portion of the smart grid, resulting in a poor quality power charge. For example, the grid control center configures load requirements on the smart grid such that the real time generation, transmission and distribution of power to the PEVs is continuous, reliable, and high quality.

To provide information to the grid control center, the present invention provides a Session Initiation Protocol (SIP) as a low-latency, scalable communication protocol used by the smart grid, particularly, between a PEV (or a user device) and a grid control center. Further, the invention provides a presence server in a utility (e.g., electricity supplier) domain or in a network service provider domain. The presence server allows authorized entities, such as the grid control center, a utility provider, and/or a network service provider, to subscribe to information (e.g., a location) of a charging station and/or PEV, for managing the charging of the PEV by charging stations on the smart grid.

Advantageously, by improving its situational awareness of loads on the smart grid, the grid control center of the present invention is able to perform real time control of loads on the smart grid, for example, to direct PEVs to particular charging stations that can most effectively and most efficiently provide a charge to the PEVs. The present invention directs the PEVs to a particular charging station taking into consideration information, such as current battery charges of the PEVs, current loads at locations of the smart grid, costs of power at the locations, and charge wait times at the locations, etc. In this way, the grid control center prevents overloading of the smart grid at a particular charging station and prevents power outages in the smart grid, as well as more effectively manages the smart grid to reduce costs, emissions, etc. In addition, the invention provides consumers with faster, more reliable power charges of their PEVs (or mobile devices), the ability to reserve a spot at a charging station, and more preferable select charging rates.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
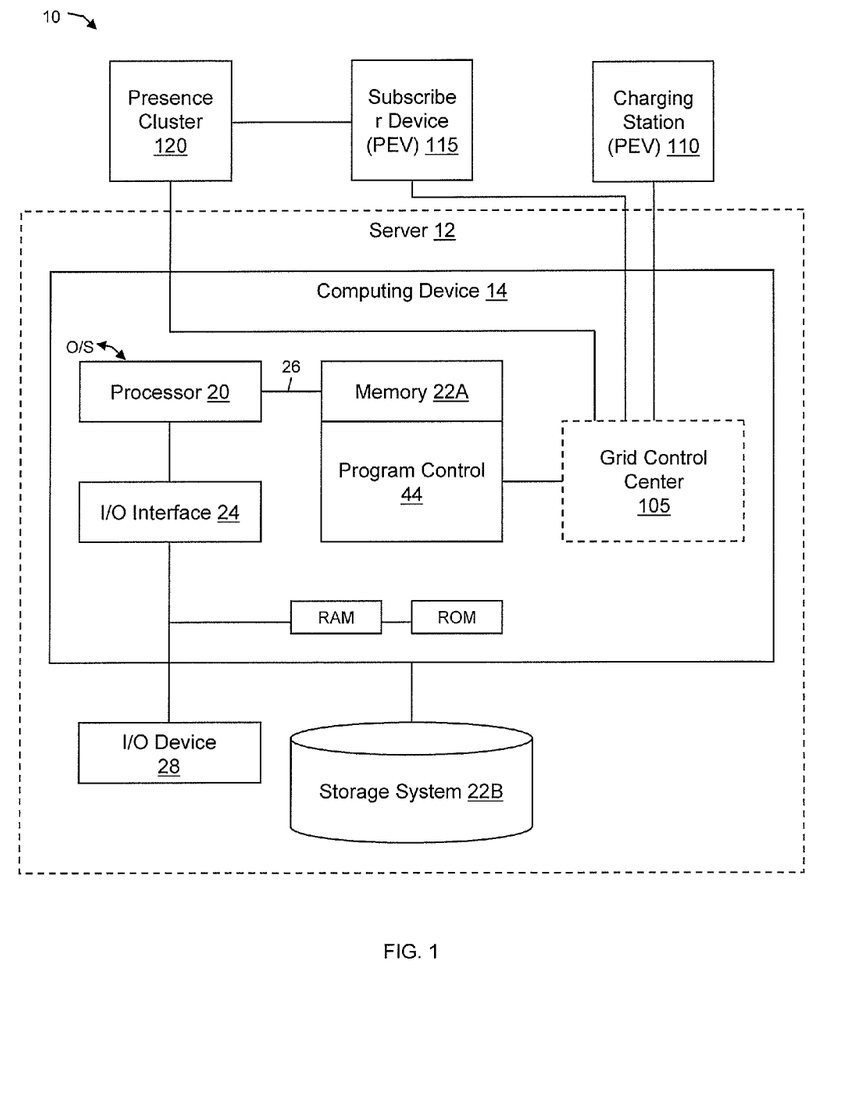
FIG. 1 shows an illustrative environment of a sever and/or a computing device for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a grid control center 105, e.g., the processes described herein. The grid control center 105 can be implemented as one or more program code in the program control 44 stored in memory 22A as separate or combined modules. Additionally, the grid control center 105 may be implemented as separate dedicated processors or a single or several processors to provide the function of this tool. Moreover, it should be understood by those of ordinary skill in the art that the grid control center 105 is used as a general descriptive term for providing the features and/or functions of the present invention, and that the grid control center 105 may comprise many different components such as, for example, the components and/or infrastructure described and shown with reference to FIG. 2.

In embodiments, the grid control center 105 optimizes and manages loads in a smart grid. The grid control center 105 can be connected to at least one charging station 110 operable to provide a power charge to, e.g., a PEV associated with at least one subscriber device 115. The subscriber device 115 can be, for instance, a mobile phone and/or a smartphone of a subscriber driving a PEV within an area of the smart grid, or can be a communication device embedded in the PEV. Although the present invention describes PEV charging stations, it should be understood that other charging stations and mobile devices are contemplated by the invention, such as smartphones and respective charging stations.

To optimize and manage a mobile load (e.g., a PEV), the charging station 110 communicates with the grid control center 105. For example, the charging station 110 sends the grid control center 105 charging station information. In embodiments, the charging station information may include, for instance, a location of the charging station 110, a charging capacity (e.g., a power load) at the charging station 110, a charging rate at the charging station 110, a charging wait time at the charging station 110, and/or a charging condition (e.g., a high or low quality power charge) at the charging station 110. The grid control center 105 can generate grid information based on monitoring and compiling charging station information from multiple different charging stations.

In embodiments, through SIP messaging, the subscriber device 115 can communicate with a presence cluster 120 in the smart grid, for example, to subscribe with the presence cluster 120 to be notified of charging station information including the best location, charging rate, charging wait time, etc. of a charging station for charging the mobile load associated with the subscriber device 115. Through the presence cluster 120, the subscriber device 115 may send to the grid control center 105 a request for the charging station information ("an event notification") based on an automated signal from a PEV, per predetermined threshold (e.g., when the PEV detects that its battery is charged at 30%) and/or based on manual initiation by the subscriber. The event notification may include, for instance, a location of the subscriber device 115 that can be retrieved via a Global Positioning System (GPS) in the subscriber device 115, a battery charge status of the mobile load (e.g., the PEV) associated with the subscriber device 115, a charging rate preferred by the subscriber, a charging wait time preferred by the subscriber, and/or a distance to a charging station that the subscriber is willing to travel. The battery charge status may include, for example, a current battery usage of the PEV, a need to have a power charge within a certain time period, and/or a distance range depending on the current battery usage and the need to have the power charge within the time span.

In embodiments, the grid control center 105 can receive event notifications from the subscriber device 115 and other subscriber devices, for charging mobile loads associated with these devices. Based on the generated grid information (e.g., the compilation of the charging station information from various charging stations) and the received event notifications, the grid control center 105 analyzes potential loads at the charging stations. Through this analysis and predetermined grid configuration rules, the grid control center 105 determines the charging station information including, for example, the best location, charging rate, and charging wait time of a charging station for charging the mobile load associated with the subscriber device 115.

The grid control center 105 sends the determined charging station information to the subscriber device 115, and updates the grid information based on the event notifications, the grid information, and the determined charging station information. For example, the updating can include calculating estimated loads at each charging station, e.g., assuming that the mobile load associated with the subscriber device 115 is being charged at the preferred charging station. The grid control center 105 then configures the smart grid based on the updated grid information by for example, sending the updated grid information or updated charging station information to each charging station, which instructs the preferred charging station to charge the mobile load. In particular, the grid control center 105 may send a unique identifier of the mobile load or the associated subscriber device 115 to the preferred charging station, along with a message instructing the preferred charging station to make a reservation for charging the mobile load at the preferred charging station. Further, the grid control center may send the unique identifier of the mobile load or the associated subscriber device 115 to other charging stations, along with a message instructing the other charging stations to void any reservations (e.g., previously made by the subscriber) for charging the mobile load at the other stations. In embodiments, the grid control center 105 can communicate with any of the charging stations via a SIP messaging. For example, the control center can receive the charging station information of the charging station via SIP messaging. Advantageously, the grid control center 105 configures the smart grid to be able to efficiently handle the mobile load associated with the subscriber device 115, which keeps the grid stable. This can also be done via SIP messaging.

While executing the computer program code, the processor 20 can read and/or write data to/from memory 22A, storage system 22B, and/or I/O interface 24. The program code executes the processes of the invention, for example, functions of the grid control center, e.g., managing mobile loads in the smart grid. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
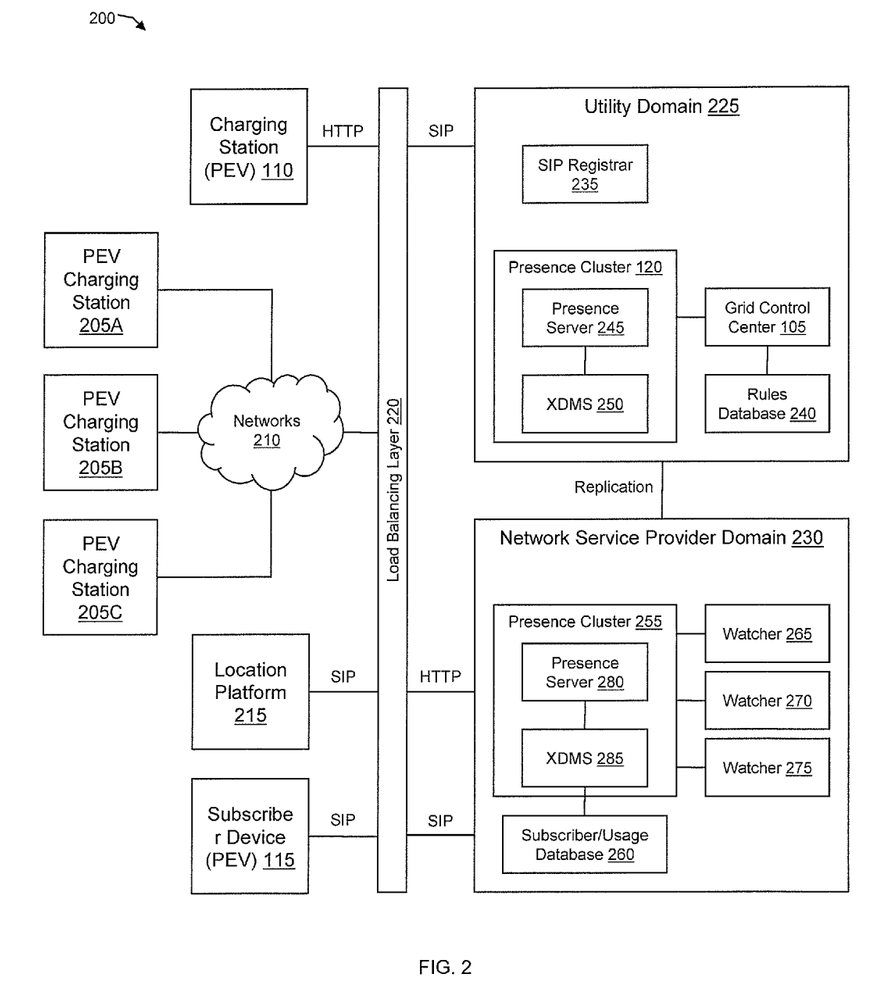
FIG. 2 shows another illustrative environment for implementing the steps in accordance with aspects of the invention.

FIG. 2 shows another illustrative environment 200 for implementing the steps in accordance with aspects of the invention. In embodiments, the environment 200 can include the charging station 110, the subscriber device 115, PEV charging station 205A, PEV charging station 205B, PEV charging station 205C, networks 210, a location platform 215, a load balancing layer 220, a utility domain 225, and a network service provider domain 230. The charging station 110 and the subscriber device 115 may be the charging station 110 and the subscriber device 115 in FIG. 1.

In embodiments, each of the charging station 110 and the PEV charging stations 205A-205C can be a charging station operable to provide a power charge to PEVs, which can be located in multiple different locations in the smart grid. Each of the stations 110 and 205A-205C may include a web client that allow the stations 110 and 205A-205C to communicate in HTTP with other entities that can also communicate in HTTP, such as the network service provider domain 230. Each of the stations 110 and 205A-205C can communicate with the other HTTP entities via the networks 210 that can include any type of network, e.g., the Internet, a cellular network, and/or the Mobile Web.

In embodiments, the subscriber device 115 may be any device that interfaces with a subscriber or driver of a PEV, e.g., a smartphone, a personal computer (PC), a laptop, and/or a communication device embedded in the PEV. The subscriber device 115 can have a lightweight SIP client and a radio antenna connected to the SIP client, which allow the subscriber device 115 to communicate in SIP with other entities that can also communicate in SIP, such as the utility domain 225. The location platform 215 may be a network server in, for example, the networks 210, operable to provide a location of an entity (e.g., the subscriber device 115) to the entity or other entities through SIP messaging. The location platform 215 can determine the location of the subscriber device 115 based on, for instance, GPS.

The charging stations 110 and 205A-205C, the subscriber device 115, and the location platform 215 can communicate with domains 225, 230 via the load balancing layer 220 that may distribute data between the above entities based on, e.g., a routing table. For example, the load balancing layer 220 can be provided in a network switch and a gateway router, which may be implemented in the computing device 14 of FIG. 1. The load balancing layer 220 includes a SIP client and a web client such that the load balancing layer 220 is able to communicate in SIP and HTTP with other SIP-enabled and/or HTTP-enabled entities.

The utility domain 225 is a network domain of an electricity supplier or utility provider that can, for example, operate the charging stations 110 and 205A-205C in the smart grid. In embodiments, the utility domain 225 can include a SIP registrar 235, a presence cluster 120, the grid control center 105, and a rules database 240. The registrar 235 is a SIP server that controls SIP sessions between the subscriber device 115, the location platform 215, and the domains 225, 230. In particular, the registrar 235 handles SIP registrations of the subscriber device 115 and the location platform 215. So, over and above a Mobile Subscriber Integrated Services Digital Network Number (MSISDN) of these entities, they are registered as IP Multimedia Subsystem (IMS)/SIP clients in the domains 225, 230. In embodiments, the registrar 235 may be implemented in the server 12 and/or the computing device 14 in FIG. 1, and may be alternatively located in the network service provider domain 230 and/or a third-party location. After registration, the registrar 235 forwards SIP messages from the subscriber device 115 and the location platform 215 to components in the domains 225, 230, such as the presence cluster 120.

In embodiments, the presence cluster 120 can be the presence cluster in FIG. 1, and implemented at various locations (e.g., at charging stations) in the smart grid of the utility provider. The presence cluster 120 includes a presence server 245 and an Extensible Markup Language (XML) Data Management Server (XDMS) 250. The presence server 245 is a SIP application server that communicates and stores presence information of client devices, such as the subscriber device 115. In embodiments, the presence server 245 may be implemented in the server 12 of FIG. 1. Specifically, the presence server 245 receives SIP notify messages including the presence information from the client devices. In the case of the subscriber device 115, the presence information can include, for example, information included in an event notification sent by the subscriber device 115. The event notification may include a location of the subscriber device 115 that can be retrieved via a Global Positioning System (GPS) radio in the subscriber device 115, a battery charge status of a mobile load (e.g., a PEV) associated with the subscriber device 115, a charging rate preferred by the subscriber, a charging wait time preferred by the subscriber, and/or a distance to a charging station that the subscriber is willing to travel. In addition, the presence information can include, for instance, a location of the subscriber device 115 that can be received from the location platform 215.

With this received presence information, the presence server 245 sends the presence information to the XDMS 250 that builds or updates a presence document including the presence information as a node. In embodiments, this presence document can aggregate and include the presence information of multiple nodes or mobile loads (e.g., PEVs) within an area or overlapping geographical region that may be covered by the presence server 245, for optimum usage of smart grid infrastructure. The presence document and the SIP messages may be in a XML format, a Rich Presence Information Data (RPID) format, and/or a Presence Information Data Format (PDIF). The XDMS 250 may be implemented in the server 12 of FIG. 1.

Additionally, the presence server 245 receives SIP subscribe messages from client devices, particularly, the grid control center 105. In embodiments, the grid control center 105 can include a lightweight SIP client and a radio antenna connected to the SIP client, which allow the grid control center 105 to communicate in SIP with other entities that can also communicate in SIP, such as the subscriber device 115. The SIP subscribe messages are requests to receive (e.g., to subscribe to) updates about the presence information from the presence server 245. The presence server 245 manages these SIP subscribe messages from the client devices and when there is an update about the presence information, the presence server 245 automatically sends SIP publish messages quickly and effectively to the subscribing client devices (e.g., the grid control center 105) that include the presence information. The presence server 245 may send information regarding the subscribing client devices ("subscriber presence information") to the XDMS 250, which may then update a corresponding presence document to include such subscriber presence information. As a result, the presence document may include information regarding relationships between mobile loads (e.g., PEVs) and subscribing client devices interested in receiving updated presence information with respect to the mobile loads.

The rules database 240 includes and stores predetermined grid configuration rules set by a subscriber and/or the utility provider regarding how to configure the smart grid in response to potential mobile loads, e.g., those seeking a power charge from charging stations in the grid. In embodiments, the rules database 240 may be set by the subscriber via the subscriber device 115 and by the utility provider via the grid control center 105. For example, the grid configuration rules can indicate that the subscriber and/or the utility provider prefer a nearest charging station with a load under a predetermined maximum value, to charge a mobile load (e.g., PEV) of the subscriber. Under this grid configuration rule, if the grid control center 105 determines that a possible concentration of vehicles at a nearest charging station may cause overloading at this charging station where as another nearby charging station is more available to serve customers, then the grid control center 105 can send information of the latter charging station to the subscriber device 115. That is, the grid control center 105 may instruct the subscriber to defer his or her power charge of the mobile load until the subscriber arrives at the preferred charging station and/or until a later time. Such an instruction to defer charging can be sent to not only the subscriber device 115 but also other subscriber devices of other mobile loads to prevent overloading at the nearest charging station.

In another example, the grid configuration rules can indicate a charging station preferred by the subscriber and/or the utility provider (e.g., since it is more available) have a discounted charging rate or wait time, to provide customers an incentive to travel to the preferred charging station and keep the smart grid stable. In other words, the grid configuration rules may indicate to the grid control center 105 to set a premium rate or wait time for a certain charging station and to set a discounted charging rate or wait time for another charging station. This discounted charging rate or wait time may be sent to the subscriber device 115 and also other subscriber devices.

In embodiments, the grid configuration rules can instruct the grid control center 105 to be proactive and send the subscriber device 115 and other pre-subscribed devices charging station information of a preferred charging station when the control center 105 determines that their mobile loads are near the preferred charging station. The grid control center 105 may be operable to send this charging station information even when the devices did not send a request for the charging station information. The sent charging station information of the preferred charging station can include charging rate or wait time incentives to charge at the preferred charging station. In addition, the grid control center 105 can send to the preferred charging station a unique identifier of each of the mobile loads or their associated subscriber devices, and a message instructing the preferred charging station to a make a reservation for charging each of the mobile loads at the preferring charging station. If necessary, the grid control center 105 may also send to other charging stations the unique identifier of each of the mobile loads or their associated subscriber devices, and a message instructing the other charging stations to void any reservations for charging each of the mobile loads at the other charging stations.

The network service provider domain 230 is a network domain of an Internet service provider and/or a cellular service provider. In embodiments, the network service provider domain 230 may include a presence cluster 255, a subscriber/usage database 260, and watchers 265, 270, 275. The presence cluster 255 includes a presence server 280 and a XDMS 285, which perform functions similar to those of the presence server 245 and the XDMS 250 in the utility domain 225. In fact, all information (e.g., the presence information and the subscriber presence information) received and processed in the presence server 245 and the XDMS 250 in the utility domain 225 may be transferred to or replicated in the presence server 280 and the XDMS 285 in the network service provider domain 230, and vice versa. In embodiments, replication in the domains 225, 230 may be accomplished via peering and dedicated bandwidth between the domains 225, 230. In embodiments, the presence servers 245, 280 may be in a hierarchal relationship, for instance, where the presence server 245 is a primary, master server and the presence server 280 is a secondary, slave server.

The subscriber/usage database 260 receives the built or replicated presence documents from the XDMS 285 and stores the presence documents for the system. The watchers 265, 270, 275 are entities in the network service provider domain 230 that send SIP subscribe messages to the presence cluster 255 to subscribe to updates regarding the presence information in the presence server 280, e.g., the SIP publish messages. For example, one of the watchers 265, 270, 275 may represent the utility provider, and may be implemented in the computing device 14 in FIG. 1. By subscribing to the SIP publish messages, the watchers 265, 270, 275 are able to watch for the presence information of the subscriber device 115 and other devices associated with mobile loads. In addition, the watchers 265, 270, 275 are able to react to the presence information as necessary. For instance, if the watcher 265 observes an event notification sent by the subscriber device 115 requesting charging station information, then the watcher 265 can perform the same functions as the grid control center 105, e.g., send the requested charging station information to the subscriber device 115 and reconfigure the smart grid for the mobile load. This provides a decentralized approach (e.g., involving multiple watchers or actors) in controlling mobile loads and reconfiguring the smart grid for these mobile loads.

In embodiments, presence infrastructure (e.g., the presence cluster 255) may be only present in the network service provider domain 230, and a watcher (e.g., the grid control center 105) may be only present in the utility domain 225. In other words, the grid control center 105 may correspond to a watcher. In this embodiment, the grid control center 105 can subscribe to all presence information updates or events, and reacts as necessary. To transfer information, the domains 225, 230 may include dedicated bandwidth between the two sides. In embodiments, the presence infrastructure can include multiple presence clusters for different types of devices, such as charging station, subscriber devices, and watchers.

In operation, once the grid control center 105 receives event notifications from the subscriber device 115 and other devices, for charging mobile loads associated with these devices, the control center 105 determines charging station information of a preferred charging station based on the grid information, the received event notifications, and the grid configuration rules. The grid control center 105 sends the determined charging station information to the subscriber device 115 (and possibly the other devices), and updates the grid information based on the event notifications, the grid information, and the determined charging station information assuming that the mobile load of the subscriber device 115 will be charged at the preferred charging station. The grid control center 105 then configures the smart grid based on the updated grid information by for example, sending the updated grid information or updated charging station information to each charging station. In response, each charging station can provide power charges based on the updated information, and can make or void power charge reservations for potential mobile loads.

Advantageously, the present invention avoids excessive mobile loads at one charging station when another portion of the smart grid is not optimally-used. Further, the present invention provides subscribers or customers with the abilities to acquire information regarding charging of their devices and to control the charging of their devices, e.g., to travel to charging stations with charging rate or wait time discounts.

Figure 3:
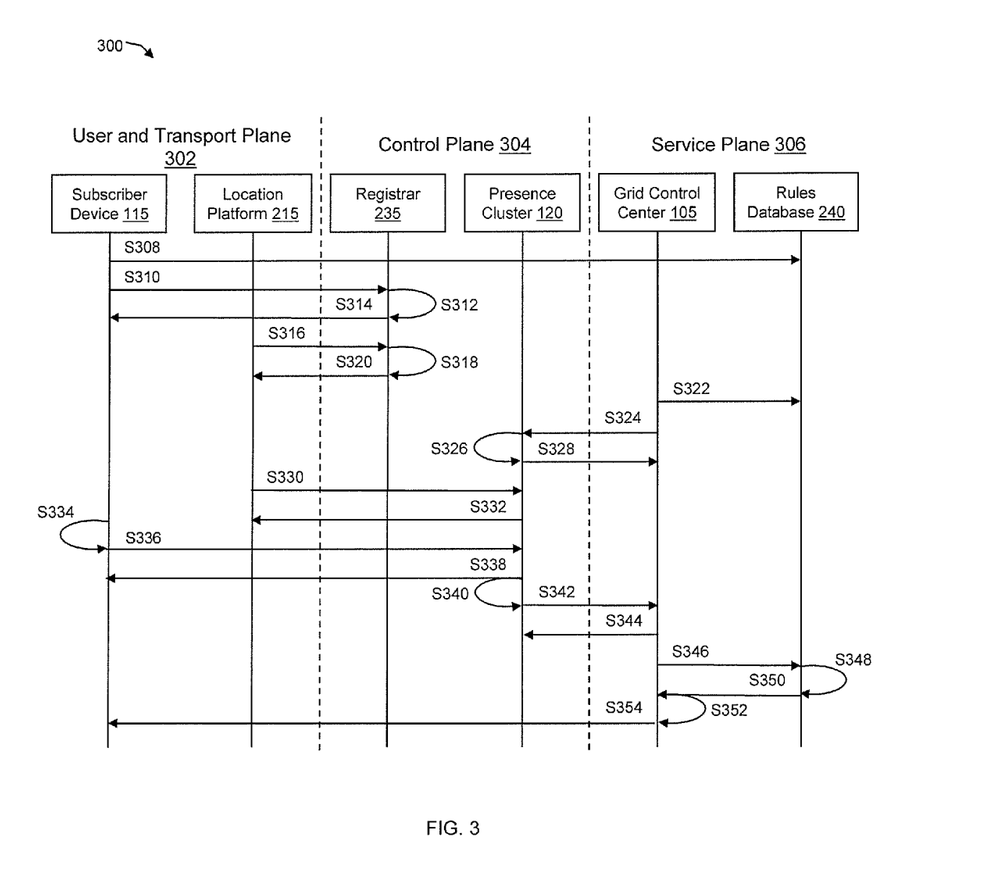
FIGS. 3-5 show exemplary flows for optimizing and managing a load in an electrical grid in accordance with aspects of the invention.
Figure 4:
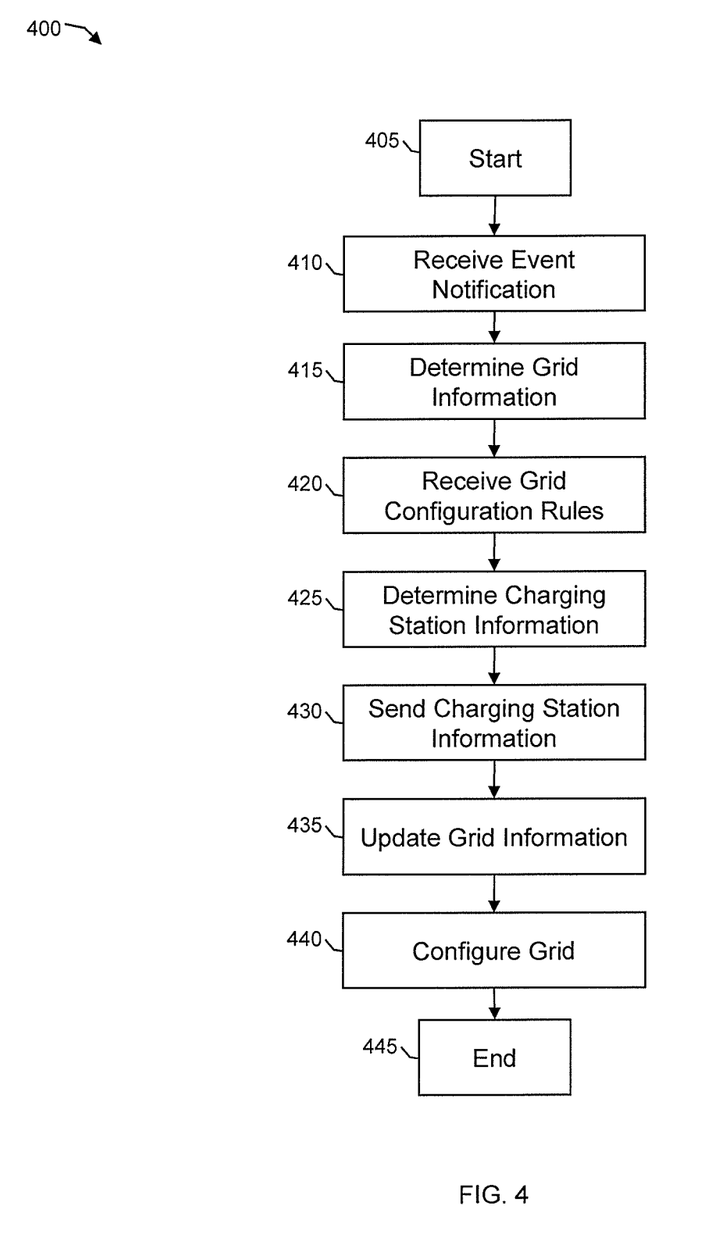
Figure 5:
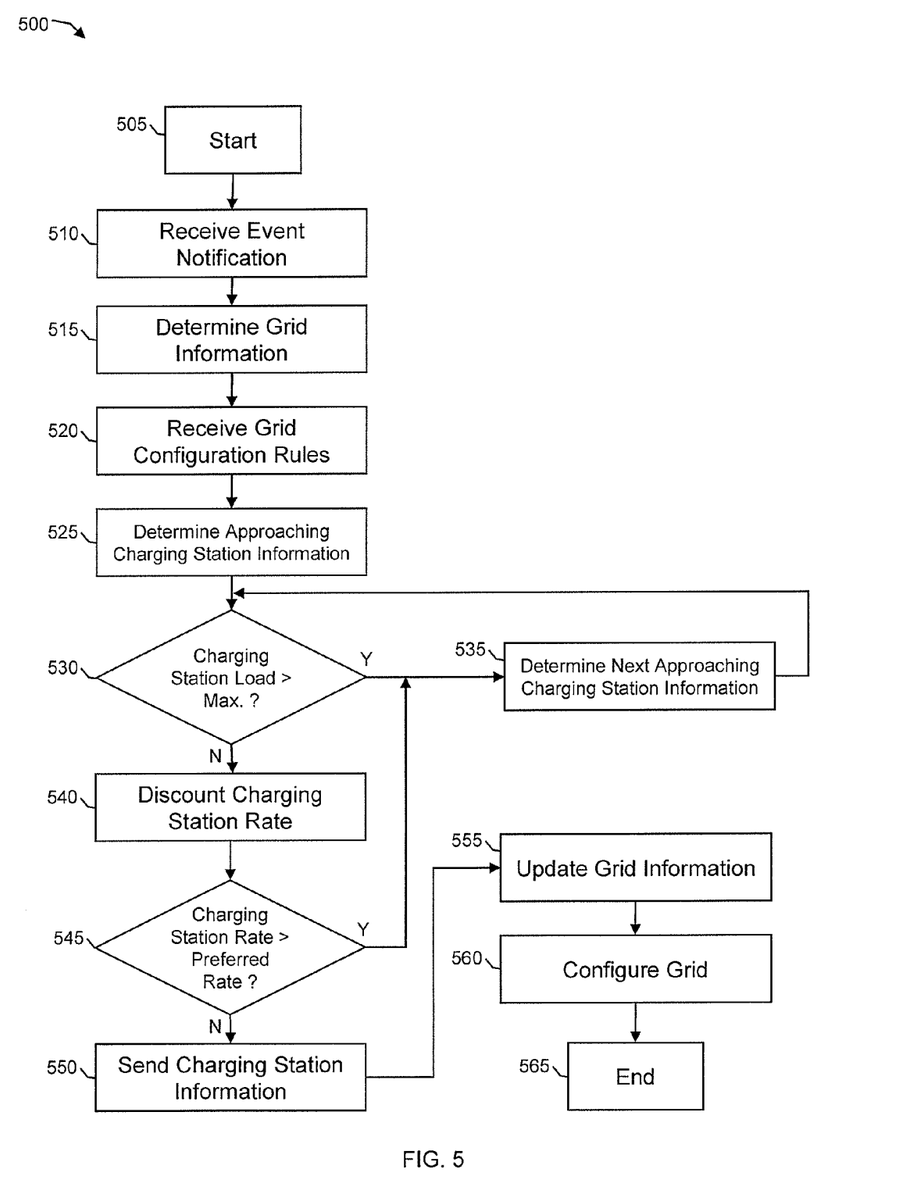

FIGS. 3-5 show exemplary flows for performing aspects of the present invention. The steps of FIG. 3-5 may be implemented in the environment of FIGS. 1 and/or 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process 300 of optimizing and managing a load in an electrical grid in accordance with aspects of the present invention. The process 300 involves three players: a user and transport plane 302, a control plane 304, and a service plane 306. The user and transport plane 302 includes the subscriber device 115 and the location platform 215, e.g. the subscriber device 115 and the location platform 215 in FIG. 2. The control plane 304 includes the registrar 235 and a presence cluster 120, e.g., the registrar 235 and the presence cluster 120 and/or 255 in FIG. 2. The service plane 306 includes a grid control center 105 and the rules database 240, e.g., one of the watchers (e.g., utility (e.g., control center), a service provider or other third party) 265, 270, 275, and/or the grid control center 105 and the rules database 240 in FIG. 2.

At step S308, the process starts, and the subscriber device 115 provisions a set of rules associated a consent to share its location information and/or a set of grid configuration rules that indicate to the grid control center 105 how to configure the smart grid in response to potential mobile loads, e.g., those seeking power charges from charging stations in the grid. At step S310, the subscriber device 115 sends a SIP register message via a gateway router (e.g., the load balancing layer 220) to the registrar 235, to register the subscriber device 115 in the IMS/SIP network housed in the utility domain 225 of FIG. 2, the network service provider domain 230 of FIG. 2, and/or a third party location. At step S312, the registrar 235 registers the subscriber device 115 in the IMS/SIP network using SIP semantics, such as Initial Filter Criteria (iFC). At step S314, the registrar 235 sends a SIP acknowledgment message to the subscriber device 115 that indicates that the subscriber device 115 has been registered successfully.

At step S316, the location platform 215 sends a SIP register message via a gateway router (e.g., the load balancing layer 220) to the registrar 235, to register the location platform 215 in the IMS/SIP network. At step S318, the registrar 235 registers the location platform 215 in the IMS/SIP network using SIP semantics. At step S320, the registrar 235 sends a SIP acknowledgment message to the location platform 215 that indicates that the location platform 215 has been registered successfully.

At step S322, the grid control center 105 provisions a set of grid configuration rules that indicate to the grid control center 105 how to configure the smart grid in response to potential mobile loads. At step S324, the grid control center 105 sends a SIP subscribe to the presence cluster 120 to subscribe to updates in presence information in the presence cluster 120, such as an event notification from the subscriber device 115. At step S326, the presence cluster 120 adds the grid control center to a watcher list of devices subscribing to updates in the presence information. At step S328, the presence cluster 120 sends a SIP acknowledgment message to the grid control center 105 that indicates that the grid control center 105 has subscribed successfully with the presence cluster 120.

At step S330, the location platform 215 sends a SIP notify message including a location of the subscriber device 115, determined at the location platform 215, to the presence cluster 120. At step S332, the presence cluster 120 sends a SIP acknowledgement message to the location platform 215 that indicates that the presence cluster 120 has received the location of the subscriber device 115. At step S334, the subscriber device 115 detects an event at the associated mobile load (e.g., when its battery is charged below a predetermined threshold, e.g., 30%, and/or when the subscriber manually initiates the event). At step S336, the subscriber device 115 sends a SIP notify message including the event notification to the presence cluster 120. At step S338, the presence cluster 120 sends a SIP acknowledgement message to the subscriber device 115 that indicates that the event notification has been received. In embodiments, steps S334-S338 may be also performed between other subscriber devices and the presence cluster 120.

At step S340, the presence cluster 120 processes the SIP notify message, including building or updating a presence document including the event notification as presence information and storing the presence document in a database, e.g., the subscriber/usage database 260. At step S342, the presence cluster 120 cycles through its watcher list and sends a SIP publish message that includes the updated presence information to the grid control center 105 (and other watchers). At step S344, the grid control center 105 sends a SIP acknowledgement message to the presence cluster 120 that indicates that the presence information has been received.

At step S346, the grid control center 105 requests a grid configuration rule from the rules database 240 based on the received event notification and grid information that the grid control center 105 monitors and compiles. At step S348, the rules database 240 processes the request, specifically, determining the grid configuration rule based on the event notification and the grid information. At step S350, the rules database 240 responds with the grid configuration rule. At step S352, the grid control center 105 determines charging station information of a preferred charging station based on the event notification, the grid information, and the grid configuration rule, and also configures the smart grid based on the determined charging station information. At step S354, the grid control center 105 sends the determined charging station information to the subscriber device 115, to optimize and manage the mobile load associated with the subscriber device 115. At step S354, the process ends.

FIG. 4 shows another exemplary flow for a process 400 of optimizing and managing a load in an electrical grid in accordance with aspects of the present invention. In embodiments, the process 400 may be performed by a grid control center, for example, the watchers 265, 270, 275, and/or the grid control center 105 in FIG. 2. At step 405, the process starts.

At step 410, the grid control center receives an event notification of a subscriber device (e.g., a request for charging station information of a charging station where a mobile load or PEV associated with the subscriber device can be charged; a location of the subscriber device; and/or a charge remaining on the mobile load or PEV). In embodiments, the event notification may be received from the subscriber device via a presence cluster, e.g., the subscriber device 115 and the presence cluster 120 in FIGS. 1-2. At step 415, the grid control center determines grid information including charging station information of at least one charging station in the electrical grid. The grid control center can monitor at least one charging station (e.g., the charging station 110 in FIGS. 1-2) for the charging station information.

At step 420, the grid control center receives grid configuration rules that indicate to the grid control center how to configure the electrical grid in response to potential mobile loads, such as the mobile load associated with the subscriber device. In embodiments, the grid control center may be received from a rules database, e.g., the rules database 240 in FIG. 2. At step 425, the grid control center determines charging station information of a preferred charging station (e.g., a nearest charging station with a lowest charging rate or wait time) based on the event notification, the grid information, and the grid configuration rules.

At step 430, the grid control center sends the determined charging station information to the subscriber device, which may use the determined charging station information to have a subscriber travel to the preferred charging station and charge his or her mobile load at the preferred charging station. At step 435, the grid control center updates the grid information based on the event notification, the grid information, and the determined charging station information. The updating can include, for example, updating the charging station information of the preferred charging station assuming the mobile load associated with the subscriber device will be charged at the preferred charging station. At step 440, the grid control center configures the electrical grid via, for instance, sending the updated charging station information of the preferred charging station, to the preferred charging station, which can then make a power charge reservation for the mobile load associated with the subscriber device. In another example, the grid control center may send a unique identifier of the mobile load or the associated subscriber device to the preferred charging station, along with a message instructing the preferred charging station to make a reservation for charging the mobile load at the preferred charging station. Further, the grid control center may send the unique identifier of the mobile load or the associated subscriber device to other charging stations, along with a message instructing the other charging stations to void any reservations (e.g., previously made by the subscriber) for charging the mobile load at the other stations. At step 445, the process ends.

FIG. 5 shows another exemplary flow for a process 500 of optimizing and managing a load in an electrical grid in accordance with aspects of the present invention. In embodiments, the process 500 may be performed by a grid control center, for example, the watchers 265, 270, 275, and/or the grid control center 105 in FIG. 2. At step 505, the process starts.

At step 510, the grid control center receives an event notification of a subscriber device (e.g., a request for charging station information of a charging station where a mobile load or PEV associated with the subscriber device can be charged, and a location of the subscriber device). In embodiments, the event notification may be received from the subscriber device via a presence cluster, e.g., the subscriber device 115 and the presence cluster 120 in FIGS. 1-2. At step 515, the grid control center determines grid information including charging station information of at least one charging station in the electrical grid. The grid control center can monitor at least one charging station (e.g., the charging station 110 in FIGS. 1-2) for the charging station information.

At step 520, the grid control center receives grid configuration rules that indicate to the grid control center how to configure the electrical grid in response to potential mobile loads, such as the mobile load associated with the subscriber device. In embodiments, the grid control center may be received from a rules database, e.g., the rules database 240 in FIG. 2. In embodiments, the grid configuration rules can indicate that the subscriber and/or a utility provider prefer a nearest charging station with a load under a predetermined maximum value and charging rate under a charging rate preferred by the subscriber, to charge a mobile load (e.g., PEV) of the subscriber. Although FIG. 5 shows such a grid configuration rule, other grid configuration rules may be contemplated in the present invention and can indicate that the subscriber prefers, e.g., a nearest charging station with a charging wait time under a charging wait time preferred by the subscriber, and/or a farthest charging station that a battery charge status of a PEV allows the PEV to travel to.

Under these grid configuration rules, at step 525, the grid control center determines charging station information of a nearest charging station based on the event notification (e.g., the location of the subscriber device) and the grid information. At step 530, the grid control center determines whether a load or charging capacity of the determined charging station ("charging station load") is greater than the predetermined maximum value ("Max") based on the grid information. If the charging station load is greater than the predetermined maximum value, then the process continues at step 535. Otherwise, the process continues at step 540.

At step 535, the grid control center determines charging station information of a next nearest charging station based on the event notification and the grid information. The process returns to step 530. At step 540, the grid control center discounts a charging rate of the determined charging station ("charging station rate") based on the grid configuration rules, e.g., by a predetermined value.

At step 545, the grid control center determines whether the charging station rate is greater than a charging rate preferred by the subscriber ("preferred rate") included in the event notification received from the subscriber device. If the charging station rate is greater than the preferred rate, then the process continues at step 535. Otherwise, the process continues at step 550.

At step 550, the grid control center sends the determined charging station information, including the discounted charging station rate, to the subscriber device, which may use the determined charging station information. The subscriber can read the determined charging station information and travel to the preferred charging station to charge the mobile load at the preferred charging station. At step 555, the grid control center updates the grid information based on the event notification, the grid information, and the determined charging station information. The updating can include, for example, updating the charging station information of the preferred charging station assuming the mobile load associated with the subscriber device will be charged at the preferred charging station. At step 560, the grid control center configures the electrical grid via, for instance, sending the updated charging station information of the preferred charging station, to the preferred charging station, which can then make a power charge reservation for the mobile load associated with the subscriber device. At step 565, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
receiving, by a computing device, an event notification associated with a mobile device requiring a charge;
determining, by the computing device, grid information of an electrical grid comprising one or more charging stations operable to charge the mobile device;
receiving, by the computing device, grid configuration rules indicating how to configure the electrical grid in response to charging of the mobile device, from a rules database;
determining, by the computing device, charging station information of a preferred charging station of the one or more charging stations in the electrical grid based on the event notification, the grid information, and the grid configuration rules;
sending, by the computing device, the charging station information of the preferred charging station to a user of the mobile device;
updating, by the computing device, the charging station information to include the mobile device being charged at the preferred charging station prior to the mobile device actually being charged at the preferred charging station; and
configuring, by the computing device, the electrical grid by sending the updated charging station information to the preferred charging station, which is configured to trigger the preferred charging station to make a power charge reservation at the preferred charging station for charging the mobile device,
wherein the charging station information includes a charging capacity at the preferred charging station and a charging wait time at the preferred charging station.

2. The method of claim 1, further comprising setting the grid configuration rules in the rules database.

3. The method of claim 1, wherein the user of the mobile device sets the grid configuration rules in the rules database.

4. The method of claim 1, further comprising:
updating the grid information based on the event notification, the grid information, and the charging station information.

5. The method of claim 1, wherein the determining of the grid information comprises collecting charging station information of the one or more charging stations in the electrical grid, the charging station information comprising:
locations of the one or more charging stations;
charging capacities at the one or more charging stations;
charging rates at the one or more charging stations;
charging wait times at the one or more charging stations; and
charging conditions at the one or more charging stations.

6. The method of claim 1, wherein the event notification comprises at least one of:
a location of the mobile device;
a battery charge status of the mobile device;
a charging rate preferred by the user of the mobile device;
a charging wait time preferred by the user; and
a distance to a charging station that the user is willing to travel.

7. The method of claim 1, wherein the mobile device comprises a plug-in electric vehicle (PEV).

8. The method of claim 1, wherein the sending of the charging station information comprises sending:
a location of the preferred charging station;
the charging capacity at the preferred charging station;
a charging rate at the at preferred charging station;
the charging wait time at the preferred charging station; and
a charging condition at the preferred charging station.

9. The method of claim 1, wherein a service provider at least one of creates, maintains, deploys and supports a computer infrastructure operable to perform the steps of claim 1.

10. The method of claim 1, wherein steps of claim 1 are provided by a service provider on a subscription, advertising, and/or fee basis.

11. A method of optimizing and managing loads in an electrical grid, comprising:
providing a computer infrastructure comprising a computing device, the computing device being operable to:
receive an event notification associated with a mobile device requiring a charge;
determine grid information of an electrical grid comprising one or more charging stations operable to charge the mobile device;
receive grid configuration rules indicating how to configure the electrical grid in response to potential charging of the mobile device from a rules database;
determine charging station information of a preferred charging station of the one or more charging stations in the electrical grid based on the event notification, the grid information, and the grid configuration rules;
send the charging station information of the preferred charging station to a user of the mobile device prior to the user arriving at a location of the preferred charging station;
update the charging station information to include the mobile device being charged at the preferred charging station prior to the user arriving at the location of the preferred charging station; and
configure the electrical grid by sending the updated charging station information to the preferred charging station and other charging stations of the one or more preferred charging stations, which is configured to trigger the preferred charging station to make a power charge reservation at the preferred charging station for charging the mobile device, and trigger the other charging stations to void any reservations at the other charging stations for charging the mobile device.

* * * * *